A. C. Van Dyke.

Blast Furnace.

No. 1,052. Reissued Oct. 2, 1860.

Witnesses.

J. Pollock
E. Allwin

Inventor.
A. C. Van Dyke

UNITED STATES PATENT OFFICE.

AUGUSTUS C. VAN DYKE, OF GREENUPSBURG, KENTUCKY.

IMPROVEMENT IN HEATING ORES.

Specification forming part of Letters Patent No. 28,025, dated April 24, 1860; Reissue No. 1,052, dated October 2, 1860.

*To all whom it may concern:*

Be it known that I, AUGUSTUS C. VAN DYKE, of Greenupsburg, Greenup county, Kentucky, have invented a certain new and Improved Apparatus for Heating Ore and Charging Iron-Furnaces; and I hereby declare the following to be a full, clear, and exact description of the same, reference being had to the accompanying drawings, making part of this specification.

The said improvement consists in the peculiar construction and arrangement of heating grate or basket, conical or bell-shaped open-work valve, and feed-doors in connection with the tunnel-head of an iron-furnace, as hereinafter explained.

Figure 1:
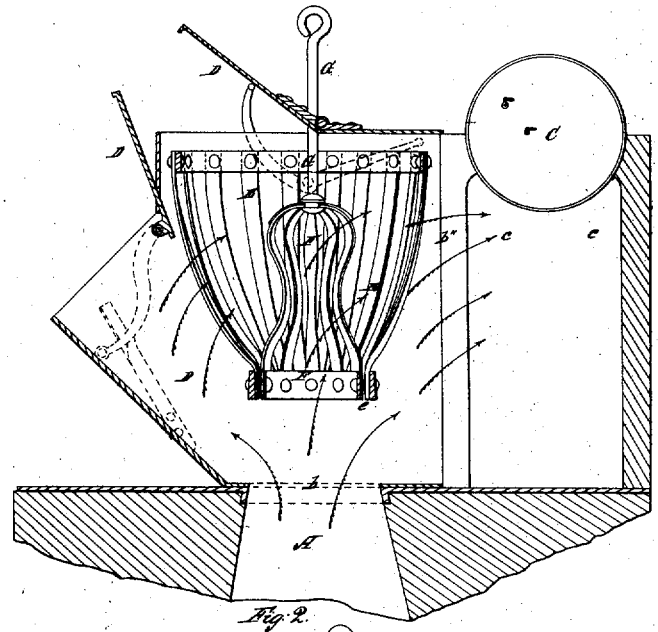
Figure 2:
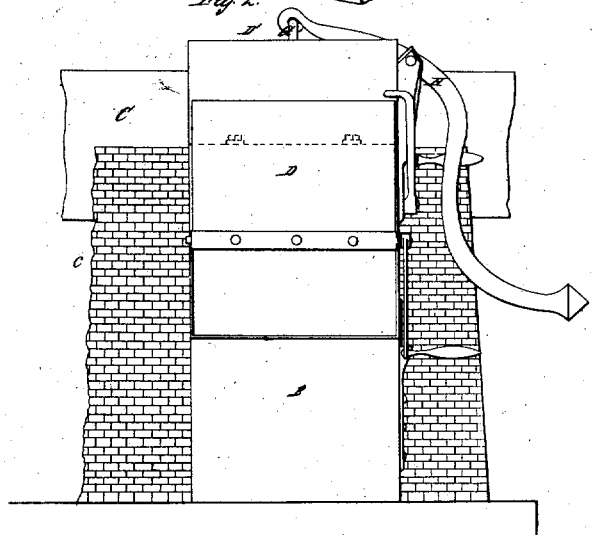

In the accompanying drawings, Figure 1 is a vertical section of the apparatus embodying my improvements. Fig. 2 is an external elevation at right angles to Fig. 1.

A is that portion of a blast or smelting furnace which forms the discharging-outlet for the waste heat and resultant gases, and is commonly known as the "tunnel-head." B is a charging box or hopper placed immediately over the tunnel-head, from which it flares upward so as to facilitate the descent of the charges. This hopper is completely closed in on every side, except an opening, *b*, at the bottom, corresponding to that of the tunnel-head A, to admit the heat and gases from the furnace, and a side opening, *b'*, through which the said gases, having acted to heat the ore, escape into the flue C of the boiler C'', which generates the steam that affords the blast power. D is a door in the side of the hopper to admit the coal, and D' is a door in its top to admit the ore and flux. These doors, except in the act of charging, are kept constantly closed. Depending from the top of the hopper B, so as to hang immediately over and to intercept the waste heat and gases from the tunnel-head, is an open-work basket grate, E, having the general form of an inverted conoidal frustum, having at its lower end a large circular aperture, *e*, which, except at the moment of discharging the ore from the grate, is close by the conical or bell-shaped open-work gate F, which, being of open work like the grate E and extending upward into said grate, greatly facilitates the entrance of the waste heat and gases and their diffusion through the ore in the basket.

It is evident that the gate F may be made more bell-shaped or more tapering, and that it may be extended upward into the interior of the basket to the center or even to near the top of the same. This is, however, a matter of judgment in construction, and does not affect the principle of my improvement. In practice I have found it well to extend it beyond the center.

The gate F is operated by a rod, G, and lever H, or their equivalents, which, being held in place by a cable or otherwise, keep the grate closed.

Operation: A charge of coal having been made through the door D, and said door being then closed, the door D' is opened and a charge of properly broken and mingled ore and flux is thrown into the grate E, and the door D' also being then closed, the ore and flux are confined on all sides as in a close furnace whose flames quickly permeate the entire mass. The ore, being thus brought into actual and intimate contact with the flames, reaches a red heat by the time another charge is necessary, when the door D being again temporarily opened, another charge of coal is thrown in, and the lever H being liberated the gate F falls and allows the red-hot mass of ore and flux to descend into the furnace. The gate F being then closed, the door D' is opened and another lot of ore and flux inserted as before.

I am aware that a basket or roaster has been used for deoxidizing ore at the tunnel-head, and also that drop-valves or false bottoms have been applied to ore-heaters for introducing the ore into the furnace; but

I claim as new and of my invention—

1. The described arrangement of the ore-heater E, gate F, rod G, and doors D and D' in connection with the tunnel-head A, the whole being constructed, combined, and operated in the manner and for the purposes herein set forth.

2. The open-work basket-grate E in combination with the conical or bell-shaped open-work gate F, when used in connection with the tunnel-head of a blast-furnace, substantially as described.

3. The conical or bell-shaped open-work gate F, for the purpose of more readily diffusing the heat and gases through the ore and of discharging the ore into the furnace when heated, substantially as described.

In testimony of which invention I hereunto set my hand.

A. C. VAN DYKE.

Witnesses:
J. POLLOCK,
I. E. WINN.